United States Patent [19]

Champeau et al.

[11] 4,296,658
[45] Oct. 27, 1981

[54] CLAMPING DEVICE FOR SIMULTANEOUSLY MACHINING INTERNALLY AND/OR EXTERNALLY, THE TWO ENDS OF A WORKPIECE

[75] Inventors: Marcel Champeau, Niort; André Tabutin, La Celle Saint Cloud, both of France

[73] Assignee: Societe Anonyme dite: Ramo S.A., France

[21] Appl. No.: 51,796

[22] Filed: Jun. 25, 1979

[30] Foreign Application Priority Data

Jun. 30, 1978 [FR] France .............................. 78 19632

[51] Int. Cl.³ ...................... B23B 19/02; B23B 25/06
[52] U.S. Cl. ............................................ 82/30; 279/4
[58] Field of Search .................. 82/30, 3, 28 R; 279/4

[56] References Cited

U.S. PATENT DOCUMENTS

| | | | |
|---|---|---|---|
| 1,979,367 | 11/1934 | Cone | 82/30 |
| 2,137,850 | 11/1938 | Miller | 82/30 |
| 2,372,592 | 3/1945 | Lovely | 279/4 |
| 3,933,061 | 1/1976 | Link | 82/30 |
| 4,032,162 | 6/1977 | Flinchbaugh | 279/4 |

FOREIGN PATENT DOCUMENTS

| | | |
|---|---|---|
| 1552455 | 1/1970 | Fed. Rep. of Germany . |
| 1752599 | 9/1971 | Fed. Rep. of Germany . |
| 1504212 | 10/1967 | France . |
| 2188469 | 1/1974 | France . |
| 347696 | 8/1960 | Switzerland . |
| 1035395 | 7/1966 | United Kingdom . |

*Primary Examiner*—Leonidas Vlachos
*Attorney, Agent, or Firm*—Lerner, David, Littenberg & Samuel

[57] ABSTRACT

A clamping device for simultaneously machining, internally and/or externally, the two ends of a workpiece, comprising a headstock housing in which a tubular spindle is mounted to rotate, said spindle being internally provided with two annular pistons sliding axially and acting respectively on two collets for clamping the workpiece.

The two clamping collets 23, 24 mounted respectively in the two pistons 12, 13 are provided with a cone-shaped portion 21, 22 cooperating with a corresponding cone-shaped portion in the pistons and a cylindrical part 25, 26 centered in the boring of the said pistons, the said collets 23, 24 resting on the side opposite their cylindrical part against the covers 27, 28 fast with the spindle 8 by a cone-shaped face extending radially in order to allow the radial tightening of the collets on the workpiece.

The invention is used in lathes with central headstock.

7 Claims, 9 Drawing Figures

CLAMPING DEVICE FOR SIMULTANEOUSLY MACHINING INTERNALLY AND/OR EXTERNALLY, THE TWO ENDS OF A WORKPIECE

The present invention concerns a clamping device for simultaneously machining the two ends of a workpiece.

To effect the machining and in particular the simultaneous turning of the two ends of a workpiece, said latter is clamped in a rotary spindle, mounted in a headstock situated in the middle of the bed of a lathe.

Said lathe is provided with two copying carriages, placed on either sides of the headstock, each one moving during their work feed towards the respective end of the spindle. This arrangement permits the simultaneous or differential machining of the two ends of a cylindrical workpiece, mounted and gripped in the tubular spindle. The machining may take place inside either one of the two ends (or both ends) of a hollow workpiece.

In this case, the length of the workpiece to be machined should be equal to or greater than the length of the spindle. It is possible to machine the outside of one or both ends of the workpiece, the protruding part at each end of the spindle being dependent on the length to be machined.

The workpiece may be placed by hand in the spindle and positioned longitudinally by a fixed or retractable abutment, and then clamped. An automatic feed which positions the workpiece before clamping and which ejects it after machining and loosening may also be provided. To clamp the workpiece in position in the headstock, it is known to use a device comprising a rotary tubular spindle, provided on the inside with two annular pistons sliding axially and acting on two collets with a cone-shaped portion cooperating with a corresponding cone-shaped portion of two parts fast with the spindle, the said collets, being situated at the ends of the spindle receiving the workpiece to be machined.

Such a device however is not fully satisfactory as regards fitting the workpiece in the collets, and it is the object of the present invention to overcome this disadvantage.

According to the present invention, the clamping collets mounted respectively in the two pistons are provided with a cone-shaped part cooperating with a corresponding cone-shaped part of the pistons, and a cylindrical part centred in the pistons bore, said collets resting, on the side opposite their cylindrical part, against covers fast with the spindle by a cone-shaped face extending radially, to allow a radial clamping of the workpiece by the collets, a central sleeve is placed inside the pistons and constitutes a spacer against which end can abut the cylindrical parts of the collets so as to ensure the guiding and positioning of the workpiece in the collets.

Due to this arrangement of the collets and to their cross-section, the workpiece is clamped without being moved longitudinally, whereas in most of the known clamping methods using collets, the workpiece may slip during the clamping operation. Moreover, the pistons are actuated in the two directions corresponding to the clamping and releasing of the collets, by a pressure of hydraulic fluid which can be reversed under the effect of the members controlling a circuit of hydraulic fluid.

In a lathe with automatic cycles and in particular with an automatic feed of the workpieces, it is necessary to obtain information regarding the position of the collets when loosened, in order to release the machined workpiece and to fit in the raw workpiece positioning it by means of retractable abutments. Having reached this particular point, the workpiece is then clamped and the abutments retracted. The information relative to the clamping allows the starting off of the machining cycle.

According to another characteristic of the invention there is provided at each end of the spindle a means for detecting the clamping and releasing positions of the collet.

The information given by the said detection means are selectively transferred to the programming relays of the working cycle of the lathe.

Other characteristics and advantages of the invention will be better understood on reading the following description of several embodiments, reference being made to the accompanying drawings in which.

Figure 1:
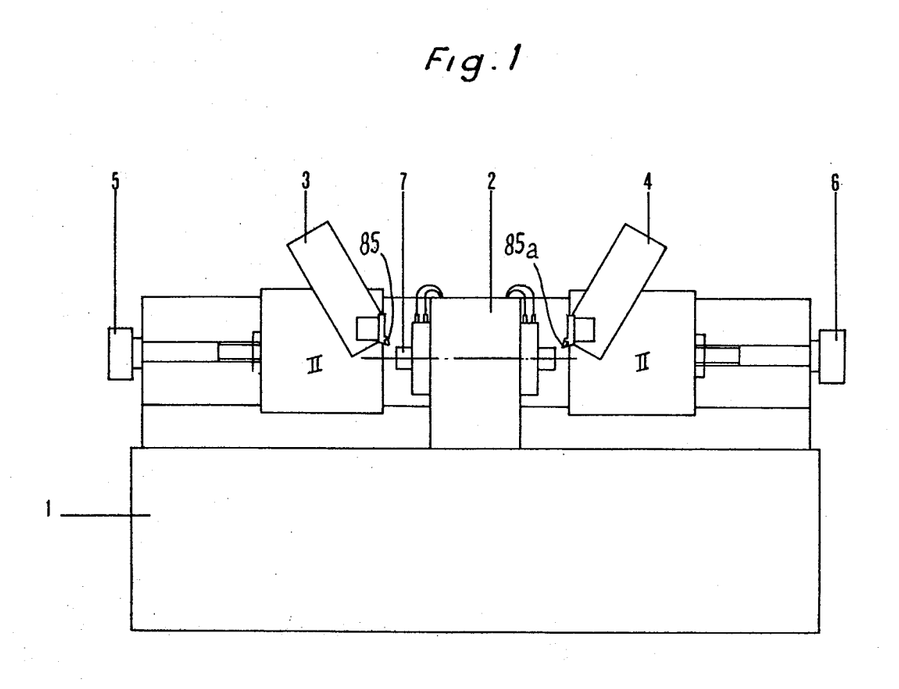
FIG. 1 is an elevational view of a lathe comprising a central headstock and two copying tool-holding carriages.

FIG. 1 shows a lathe bed 1, on which is mounted in its middle part a headstock 2 comprising a rotary spindle in which a workpiece 7 is clamped, which workpiece is machined at both ends by means of tools 85, 85a fixed on two copying carriages 3 and 4 slidably mounted on the frame of the machine on either side of the headstock 2. Said carriages and their driving motors 5 and 6 are of a known type, the connection between said latter and the respective carriages being ensured by screws and nuts. Each end of the workpiece 7 can be machined simultaneously or independently. It is possible to effect an inside or outside machining of the workpiece 7, independently for each end, or identically for the two ends.

Figure 2:
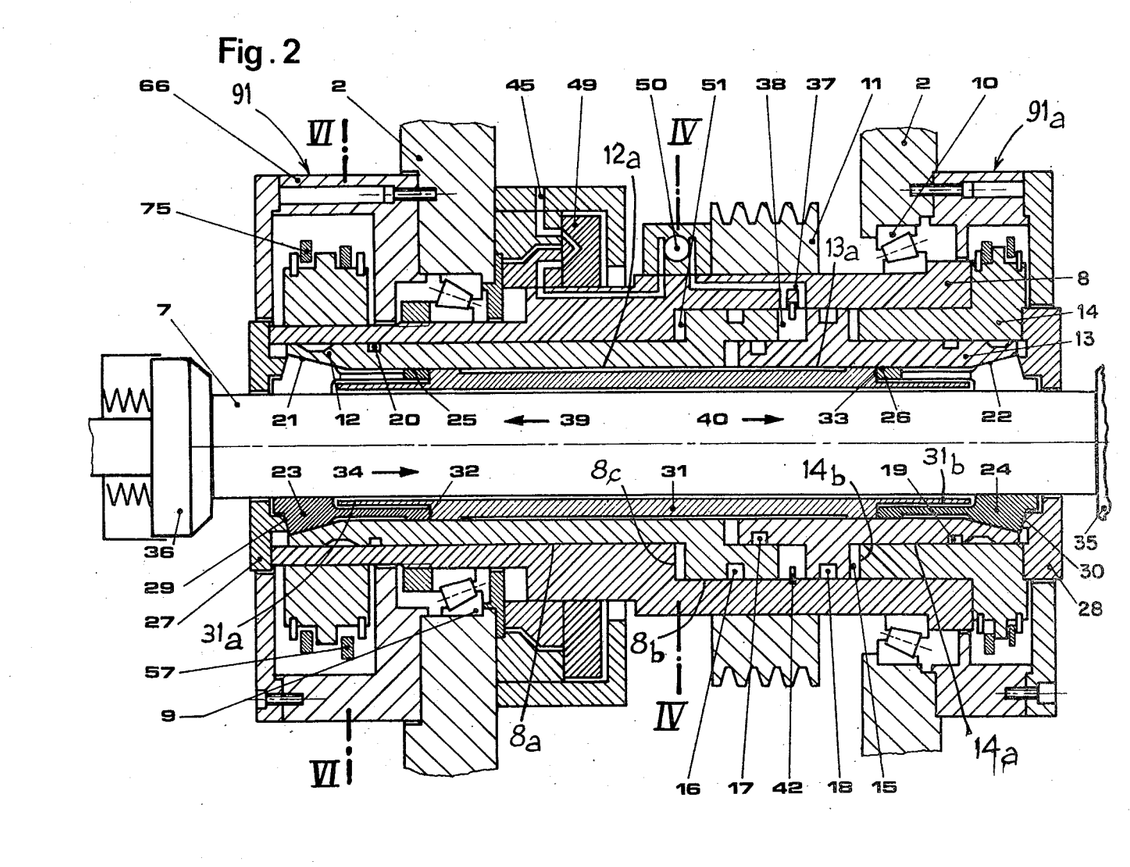
FIG. 2 is a longitudinal cross-section along the line II—II of FIG. 1 of the clamping device according to the invention, when the workpiece is clamped.
Figure 3:
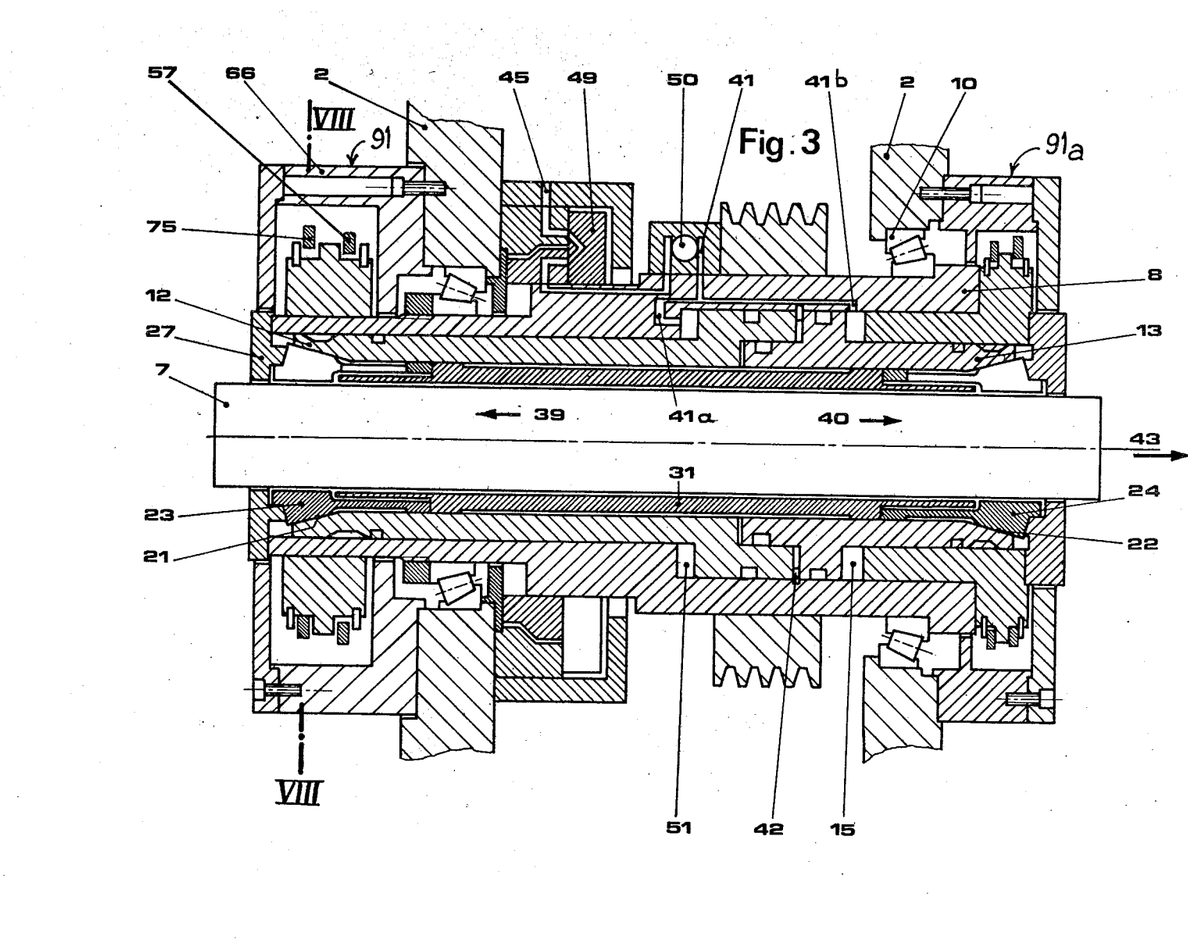
FIG. 3 is a cross-sectional view of the said device, identical to that shown in FIG. 2 when the workpiece is in the loosened position.

FIGS. 2 and 3 show the device for clamping the workpiece 7 which is mounted in the headstock 2. A spindle 8, driven in rotation by a driving member and a transmission member not shown in the drawing, and connected to a pulley 11 fast with the spindle 8, is mounted to rotate by means of roller bearings 9 and 10.

The spindle 8 is provided with staggered bores 8a and 8b in which an annular piston 12 is mounted to slide on one side, the bore 8b receiving at one end a sleeve 14 fast with the spindle.

On the other side, a second annular piston 13 is mounted to slide in the bore 8b of the spindle 8 and in the bore 14a of the sleeve 14.

Both these pistons 12 and 13 are provided with seals 16, 17, 18 for isolating the different chambers intended to receive the hydraulic fluid, as well as with seals 19 and 20 respectively mounted at the end of each piston.

Between the pistons 12 and 13 there is provided a central chamber 38 fed in hydraulic fluid by a pipe 37 connected to a hydraulic circuit described further on, the said chamber 38 which is common to both pistons 12 and 13, is meant, when fed with pressurized fluid, to move said pistons 12 and 13 away from each other, said pistons moving respectively along arrows 39 and 40.

Between the piston 12 and the bottom 8c of the bore 8b there is provided a lateral chamber 5 connected with the hydraulic circuit by means of a pipe 41a (FIG. 3), whereas a second lateral chamber 15 is provided between the piston 13 and a face 14b of the sleeve 14 connected with the circuit by a pipe 41b. When the two elements 51 and 15 are fed simultaneously with hydraulic fluid, through the pipes 41a, 41b connected to pipe 41, the two pistons are pushed back towards each other in the opposite direction to arrows 39 and 40, their travel being limited by a stop member constituted by a circlip 42 placed in the central chamber 38.

Annular pistons 12 and 13 are provided at their end and opposite each end of the spindle 8, with a female cone 21 and 22. Said cones receive corresponding cone-shaped portions of collets 23, 24 with cylindrical parts 25 and 26 centred in the bore of pistons 12 and 13.

Collets 23 and 24 are in known manner, partly slit in the longitudinal direction, in order that their bore can reduce in diameter and clamp the workpiece 7 engaged for machining in the collets 23 and 24.

At the two ends of the spindle 8 are secured covers 27 and 28 with slightly cone-shaped radial faces 29 and 30 in close contact with corresponding faces of collets 23 and 24 so as to hold said collets longitudinally in position with respect to the spindle 8.

Inside the bores 12a and 13a of pistons 12 and 13 is placed a sleeve 31 forming a spacer against the ends of which, the ends 32 and 33 of collets 23 and 24 can come to bear.

The object of this arrangement is to avoid the longitudinal clearance of the collets during loosening and in particular to facilitate the introduction of the workpiece 7 in the direction of the arrow 34 by means of a rectractable spring pusher 36 of an automatic supply device comprising a retractable abutment 35 which positions the workpiece 7 before clamping.

This arrangement is an important characteristic of the invention in that the collets 23 and 24 spaced by the sleeve 31 between the covers 27 and 28, enable to clamp the workpiece 7, without any longitudinal movement of said latter when the pistons 12 and 13 move in the direction of arrows 39 and 40 as well as in the opposite direction.

The sleeve 31 is extended at both ends by flanges 31a, 31b engaging into corresponding counterborings in collets 23 and 24

Figure 5:
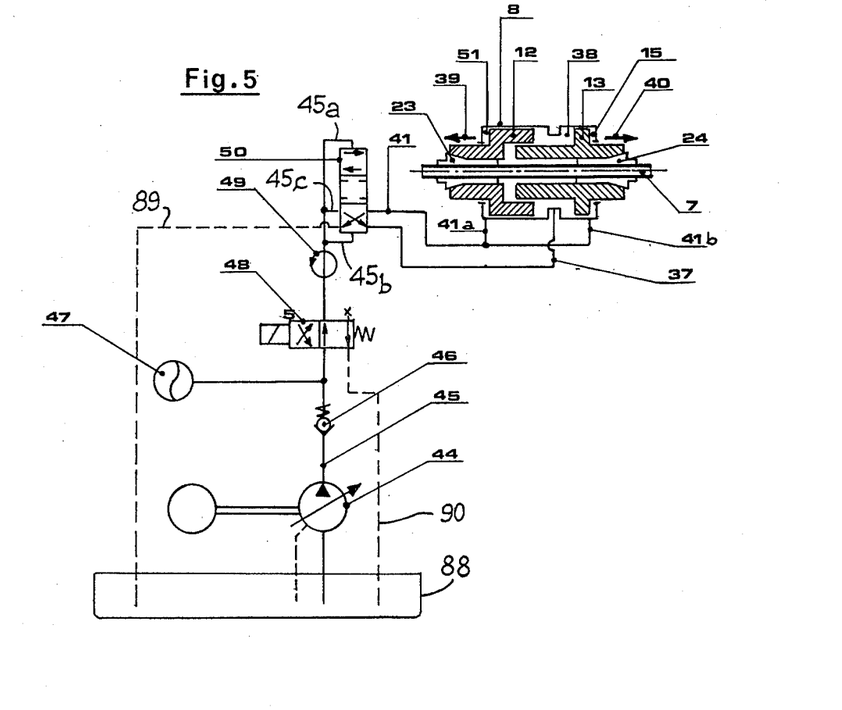
FIG. 5 is a diagram of the hydraulic control circuit.

FIG. 5 shows an embodiment of the hydraulic control circuit of pistons 12 and 13 which comprises a fluid supply tank 88 connected to a pump 44 whose delivery pipe 45, provided with a non-return valve 46, supplies a safety pressure accumulator 47.

Figure 4:
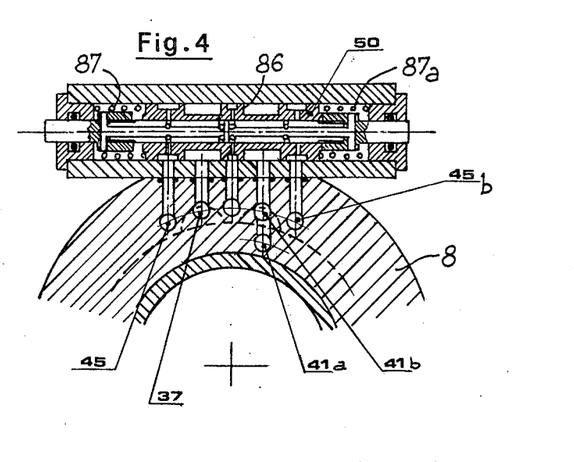
FIG. 4 is a cross-sectional view along the axis IV—IV of FIG. 2, showing the reversing valve controlling the clamping and the loosening of the workpiece.

On supply pipe 45 is also connected a distributor 48 which, by means of a rotary joint 49 situated between the housing of the headstock 2 and the spindle 8, (FIGS. 2 and 3), feeds through a reverse valve 50 secured to the spindle 8 (FIG. 4), the chambers 38, 51 and 15 of pistons 12 and 13 via pipes 37 and 41.

The reversing valve 50 (FIG. 4), which is of a known type, comprising a slide 86 subjected on either side to the action of springs 87, 87a, will not be further described since it is schematically shown in FIG. 5.

The device according to the invention works as follows

In the position shown in the drawing, the distributor 48 ensures the passage of the fluid in the pipe 45 which acts on the slide 86 of the valve 50 in the clamping direction of the collet, the pipe 45c being connected to the pipe 37 which issues into the chamber 38 and the pipe 41 being connected to the pipe 89 returning to the tank 88.

As a result, and because of the presence of the pressurized fluid in the chamber 38, the pistons 12 and 13 are displaced along arrows 39 and 40. During the displacement of each one of the pistons 12 and 13 (FIG. 2), the female cones 21 and 22 enter respectively in contact with the corresponding male cones in the collets 23 and 24 which are deformed radially since they are resting against the cone-shaped faces 29 and 30 of the covers 27, 28 and there results a tightening of their boring onto the workpiece 7 which is thus secured in the longitudinal direction and in rotation with the spindle 8.

When actuating the distributor 48 which goes to the other position, the supply through the pipe 45 is interrupted, the fluid coming from the pump being returned to the tank via the pipe 90 and the valve 50 being no longer subjected to the action of the fluid coming from the pipe 45b, the slide returns to a middle position for which the pressure is maintained in the pipe 37, as well as the collets clamping position.

At end of machining, the distributor 48 is again actuated and returns to its first position or re-establishes the supply into the pipe 45, and the slide of the valve 50 is caused to reverse and to pass into the other position for which the pipe 41 is connected to the pressure pipe 45c and the pipe 37 is connected to the tank via the pipe 89. As a result, the fluid which is in the chamber 38 is discharged towards the tank, whereas the chambers 51 and 15 are fed in pressurized fluid via the pipes 41a and 41b connected to the pipe 41.

The pistons 12 and 13 are pushed back (FIG. 3) towards each other in the opposite direction to arrows 39 and 40 and they are stopped in their travel when abutting against the circlip 42. The backward movement of the pistons, and so of the female cones 21 and 22, releases the radial action of the collets, thereby loosening the workpiece. Means, not shown in the drawing, are used to effect the ejection of the machined workpiece 7 in the direction of the arrow 43 and the injection of a raw workpiece. All these operations are programmed by the automatic cycle of the lathe.

Although the circuit illustrated is a circuit comprising a rotary joint, with only one fluid supply pipe and one reversing valve, it is also possible to use a rotary joint with two pipes and one distributor mounted on the housing of the headstock.

In the device according to the invention and mounted on a lathe with central headstock, the automatic cycle coordinates the following sequential functions: loading, clamping, machining, loosening, releasing, etc . . . , without the operator having to intervene manually or the spindle 9 stopping its rotation.

It is therefore necessary to have means for detecting whether the workpiece is really loosened in order to release it and to load the raw workpiece. It is also important to detect the clamping of said raw workpiece before starting the machining.

Such detection means 91, 91a are of course provided at each end of the spindle 8 (FIGS. 2 and 3) in order to check that the two collets 23 and 24 are in positions of clamping and loosening respectively.

In order to simplify the description and the drawings, only one detection means 91 will be described and illustrated since the detection means 91a is identical and works in the same way.

Figure 6:
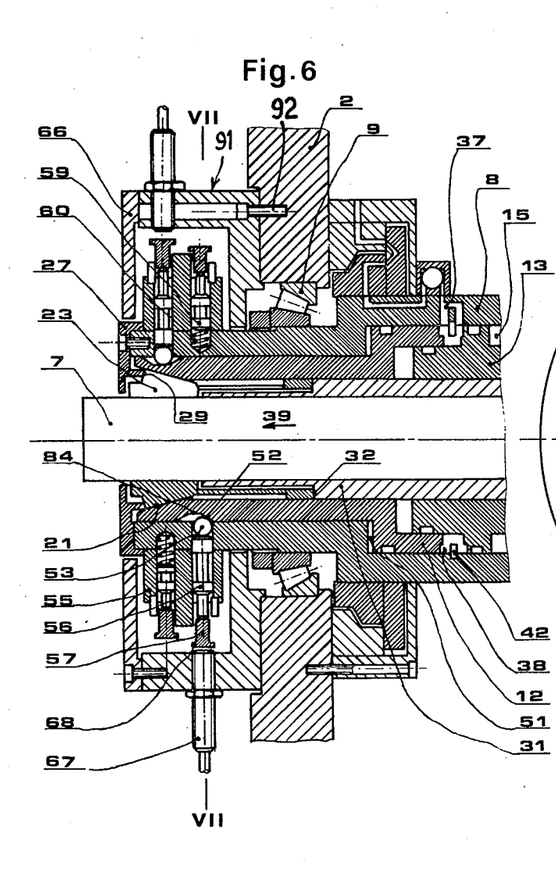
FIG. 6 is a cross-sectional view along the line VI—VI of FIG. 2, showing the detection device with the loosening detection screen in operation.
Figure 7:
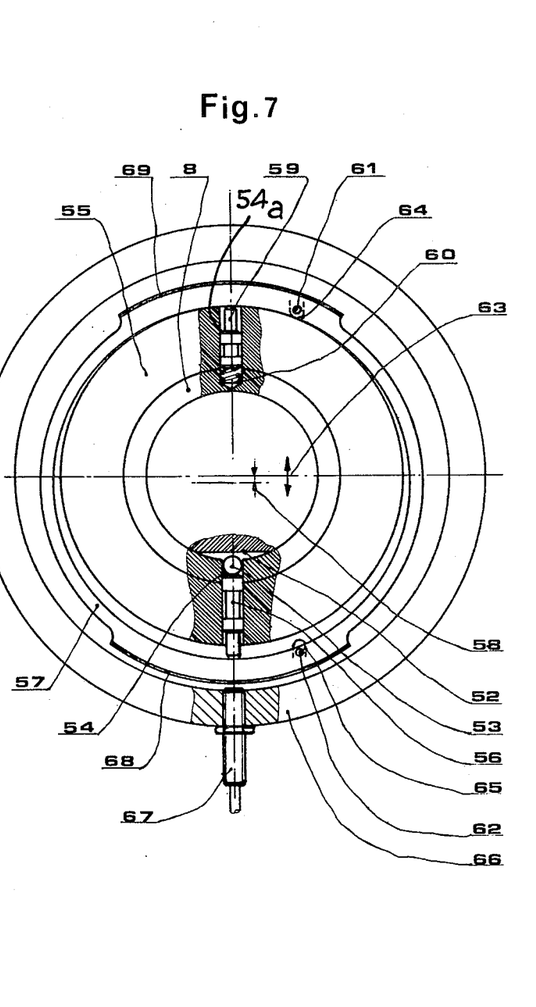
FIG. 7 is a cross-sectional view along the line VII—VII of FIG. 6.

FIGS. 6 and 7 show the detection means 91 which comprises a housing 66, secured by way of a screw 92 on the housing of the headstock 2 and in which extends one end of the lefthand part of the spindle 8 supporting an annular piece or sleeve 55 on which is mounted a collar 57, fast in rotation with the spindle and adapted to move radially in the direction of arrow 63 by means of lugs 61, 62 engaged in grooves 64, 65 provided in the annular piece 55, and limiting the deflection of the collar 57.

This arrangement allows an offsetting of the collar 57 by a distance 58. The collar 57 is provided on a certain angular portion with a magnetic screen 68 cooperating, when the collar is in an eccentric position, with an inductive detector 67 mounted on the housing 66 and adapted to transmit information to the automatic cycle program of the machine upon the passage of the screen 68 at each rotation of the spindle 8. A false screen 69 is also provided on the collar, diametrically opposed to the screen 68, in order to ensure the dynamic balancing of the collar 57.

In the portion of the spindle 8 and of the sleeve 55 which corresponds to the middle part of the screen 68, there is provided a hole 54 in which a piston 56 and a ball 53 are slidably mounted, which ball 53 is in contact with one end of the piston 56, the other being in contact with the inside of the collar 57, and the said ball 53 being in contact with a gradient 52 of a recess provided in the wall of the piston 12, the said gradient being extended by a rectilinear portion 84.

On the side diametrically opposed to the hole 54, there is provided, in the spindle and in the sleeve, a hole 54a in which a piston 59 is slidably mounted, resting on one side against the inside of the collar 57, and being subjected on the other side to the action of a return spring 60 resting on the base of the hole 54a.

When the collet 23 is in the loosened position, the ball 53 is on the rectilinear portion 84 of the piston 12 and the collar 57 is held in a concentric position with respect to the spindle by means of the return spring 60. The screen 68 is then in a position where it exerts no action on the induction field of the clamping detector 67.

For tightening the collet 23, the piston 12 should be acted upon in the manner hereinabove described, in order to move same in the direction of the arrow 39. During said movement of the piston 12, the ball 53 comes into contact with the gradient 52 and pushes back the piston 56, the effect of which is to offset the collar 57 by a distance 58 and to bring the screen 68 in the induction field of the detector 67 which transmits information to the program of the machine indicating that the collet 23 is in the clamping position.

A similar information from the clamping detection means 91a concerning the collet 24, serialized with the information of the detector 67, authorizes the machining of the workpiece.

Figure 8:
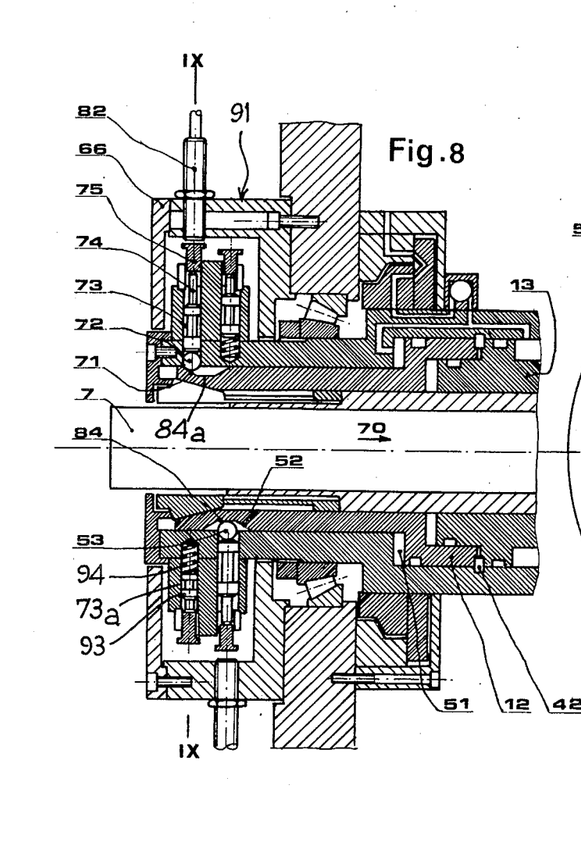
FIG. 8 is a cross-sectional view along the line VIII—VIII of FIG. 3.
Figure 9:
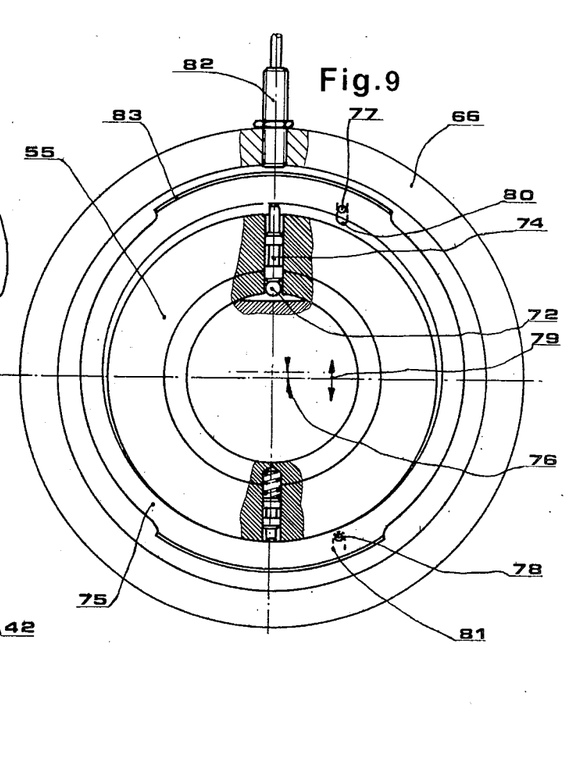
FIG. 9 is a cross-sectional view along line IX—IX of FIG. 8.

FIGS. 8 and 9 show the same detection means 91 but with the loosening control members in operation.

Said loosening control members are identical to the preceding ones, but they are located in parallel on the annular piece or sleeve 55 and they comprise a collar 75 fast in rotation with the spindle 8 and adapted to slide radially along the arrow 79 by a distance 76, pins 77 and 78 guided in grooves 80, 81 of the sleeve 55 limiting the deflection of the collar 75.

The collar 75 comprises a magnetic screen 83 adapted to cooperate with the loosening detector means 82 mounted on the housing 66 when the collar 75 is in an eccentric position.

A hole 73 provided in the spindle 8 and in the sleeve 55 receives a piston 74, slidably mounted and resting against a ball 72 which is in contact with a gradient 71 extended by a rectilinear portion 84a of a housing provided in the piston 12.

At its other end, the piston 74 is resting against the inside of the collar 75 in the middle part of the screen 83. A hole 73a is also provided in diametrically opposed manner in the sleeve 55 and the spindle 8, said hole receiving a slidably mounted piston 93, resting on one side against the inside of the collar 75 and on the other side against a return spring 94.

When the collet 23 is in the clamped position, the ball 72 is on the rectilinear portion 84a of the piston 12 and the collar 75 is held in a concentric position with respect to the spindle by means of the return spring 94.

The screen 83 is then in a position where it exerts no action on the induction field of the loosening detector 82.

To proceed to the loosening of the collet 23, the piston 12 should be acted upon in the manner hereinabove described, in order to move same in the direction of arrow 70. During said movement of the piston 12, the ball 72 comes into contact with the gradient 71 and pushes back the piston 73, the effect of which is to offset the collar 75 by a distance 76 and to bring the screen 83 in the induction field of the loosening detector 82 which transmits information to the program of the machine indicating that the collet 23 is in the loosening position.

A similar information from the loosening detector 91a concerning the collet 24, serialized with the information of detector 82, authorizes the cycle of release and of loading of the workpiece 7.

During the loosening operation described hereinabove, the positioning of the clamping collar 57 was modified as follows When the piston 12 moves along the arrow 70, it moves the gradient 52 by a value such that the ball 53 leaves the gradient 52 to occupy a position on the rectilinear portion 84.

The spring 60 pushes back the clamping collar 57 back via the piston 59. The deflection 58 is cancelled, the collar 57 resumes its concentric position with respect to the spindle 8 and the nut 68 leaves the magnetic field of the detector 67.

The information is cancelled in the lathe program.

Considering all these movements of the piston 12, it is obvious that the clamping information precedes the appearance of the loosening information with an idle time between these two points to avoid any superimposition. It is also obvious that the same phenomenon as described above also occurs in the loosening-clamping way.

Various modifications may also be brought by any one skilled in the art to the devices or methods hereinabove described solely by way of example and non-res-

What is claimed is:

1. A clamping device for simultaneously machining, internally and/or externally, two ends of a workpiece, comprising a headstock housing in which a tubular spindle is mounted to rotate, said spindle being internally provided with two annular, monolithic pistons sliding axially and acting respectively on two collets for clamping the workpiece, located at both ends of said spindle, wherein said clamping collets which are respectively mounted in said two pistons have a cone-shaped portion, which cooperates with a corresponding cone-shaped portion in said pistons, and a cylindrical part centered in the boring of said pistons, said collets resting, on the side opposite their cylindrical part, against covers fast with said spindle by means of a cone-shaped face extending radially in order to allow a radial tightening of said collets on the workpiece, and wherein a central sleeve is placed inside said pistons and constitutes a spacer against the ends of which abut said cylindrical parts of said collets so as to ensure the guiding and the positioning of the workpiece in said collets, said central sleeve being provided at its two ends with flanges engaging corresponding counterborings in said collets.

2. A device as claimed in claim 1, wherein the pistons are controlled by a hydraulic fluid from a central annular chamber provided between the two pistons in order to bring the collets in a clamping position, and from two lateral annular chambers, provided between each piston and the spindle, in order to bring the collets in a loosening position, the said central chamber comprising on the inside a stop member limiting the travel of the two pistons.

3. A device as claimed in claim 2, wherein the central and lateral chambers controlling the pistons are connected selectively by an automatic reversing valve and by a rotary joint device to a source of pressurized fluid and to a pressure-free tank, said reversing valve being controlled from a fluid distributor.

4. A device as claimed in claim 1 wherein each end of the spindle is provided with means for detecting the clamping and loosening positions of the collets.

5. A clamping device for simultaneously machining, internally and/or externally, two ends of a workpiece, comprising a headstock housing in which a tubular spindle is mounted to rotate, said spindle being internally provided with two annular pistons sliding axially and acting respectively on two collets for clamping the workpiece, located at both ends of said spindle, wherein said clamping collets which are respectively mounted in said two pistons have a cone-shaped portion, which cooperates with a corresponding cone-shaped portion in said pistons, and a cylindrical part centered in the boring of said pistons, said collets resting, on the side opposite their cylindrical part, against covers fast with said spindle by means of a cone-shaped face extending radially in order to allow a radial tightening of said collets on the workpiece, each end of said spindle being provided with means for detecting the clamping and loosening positions of said collets, each of said detecting means including a housing mounted on said headstock housing and in which extends one end of said spindle on which is secured an annular piece carrying two collars, fast in rotation with said spindle and adapted to move radially, one by a means sensitive to the movement of the collet while in the clamping position and the other by a means sensitive to the movement of the collet while in the loosening position, said collars being provided with a magnetic screen cooperating, when said collars are in an eccentric position, with members for detecting the clamping and loosening positions of the collet.

6. A device as claimed in claim 5 wherein, in the annular piece fast with the spindle and in the spindle, is slidably mounted a piston in contact at one end with the portion of collar situated on the side of the magnetic screen and at the other end with a ball moving radially against a gradient and a rectilinear portion of the piston, the said collar being subjected on the side diametrically opposed to the piston to the action of a resilient return member resting against the spindle.

7. A device as claimed in claims 5 or 6, wherein the collars supporting the magnetic screen are provided with pins slidably mounted in grooves provided on the annular piece fast with the spindle.

* * * * *